(No Model.)

P. A. SKRIVER.
CROCHET HOOK OR NEEDLE.

No. 594,040. Patented Nov. 23, 1897.

Witnesses
A. M. Parkins.
J. D. McCleary.

Inventor.
P. A. Skriver
By his attys
Bunier Goldsborough

UNITED STATES PATENT OFFICE.

PEDER ANDERSEN SKRIVER, OF CORNING, NEW YORK.

CROCHET HOOK OR NEEDLE.

SPECIFICATION forming part of Letters Patent No. 594,040, dated November 23, 1897.

Application filed June 9, 1897. Serial No. 640,002. (No model.)

*To all whom it may concern:*

Be it known that I, PEDER ANDERSEN SKRIVER, a citizen of the United States, residing at Corning, in the county of Steuben and State of New York, have invented certain new and useful Improvements in Crochet Hooks or Needles; and I do hereby declare the following to be a full, clear, and exact description of the invention, such as will enable others skilled in the art to which it appertains to make and use the same.

My invention relates to crochet needles or hooks. As is well known, implements of this character are used in knitting or crocheting threads, cords, and the like into fabric form, and ordinarily the spool upon which the material is wound is carried in the hand or held in the lap of the user. The frequent dropping of the spool and the necessity of handling it are sources of considerable annoyance, and my invention is designed to obviate such annoyances by providing the crochet-hook itself with a spindle extension of its rear end in line with the hook for supporting the spool, as will be hereinafter described, and particularly pointed out in the appended claims.

Figure 1:
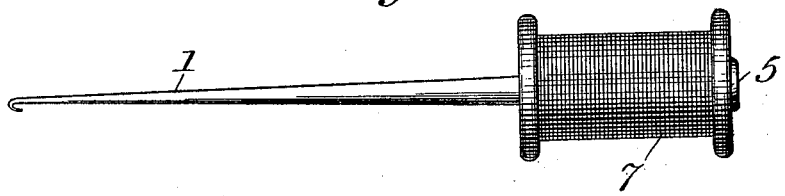
Figure 2:

In the accompanying drawings, Figure 1 is a side elevation of a crochet-hook embodying my invention and with a spool of thread in place thereon. Fig. 2 is a similar view, partly in section and with the spool shown in dotted lines; and Fig. 3 is a view in perspective, illustrating the crochet-hook in use.

The reference-numeral 1 indicates a crochet-hook of ordinary construction. It is provided at its handle end with an internally-threaded socket 2, adapted to receive the threaded end 3 of a rod or spindle 4, provided with a head or stop 5.

As shown in the drawings, the spindle 4 is of less diameter than the butt-end of the hook 1, so that this enlarged end forms a stop 6 for one end of the spool 7, the other end of which abuts against the head or disk 5 of the spindle, whereby it is held thereon.

Figure 3:
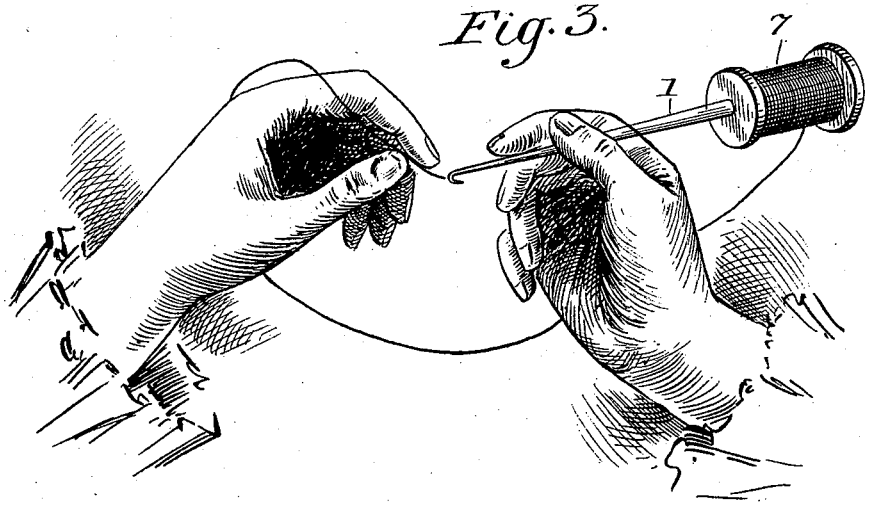

The spindle, as is apparent, may be readily detached from the hook 1 to permit the spool to be placed in position, and, as clearly illustrated in Fig. 3, the spool when placed upon the spindle is securely supported and will readily turn to unwind the thread as needed.

While I preferably construct the device as shown in the drawings, with the spindle detachably secured to the hook, I contemplate making the spindle integral with the hook 1 and constituting an extension thereof, and making the head 5 removable; also, instead of screwing the end of the spindle into a socket formed in the butt-end of the hook it may be secured thereto in any other manner that may be preferred. These modifications of the invention and any others which may fall within the purview of the following claims may be resorted to without departing from my invention.

Having thus described my invention, what I claim is—

1. The combination with the crochet-hook of a spool-supporting spindle removably secured to the handle end thereof, the outer end of the spindle being provided with the head or stop for the outer end of the spool, and the handle end of the hook forming an abutment for the opposite end of the spool.

2. The combination with a crochet-hook, provided at its handle end with an internally-threaded socket, of a spool-supporting spindle provided at its outer end with a head, and screw-threaded at its other end for engagement with said socket.

In testimony whereof I affix my signature in presence of two witnesses.

PEDER ANDERSEN SKRIVER.

Witnesses:
HARRY L. TYLER,
GEORGE HITCHCOCK.